Dec. 30, 1969  R. T. GLADWELL, JR  3,486,496
CIRCULAR SLURRY SAW

Filed Dec. 29, 1966  2 Sheets-Sheet 1

INVENTOR.
ROBERT T. GLADWELL JR.
BY *William J. Simmons Jr.*

ATTORNEY

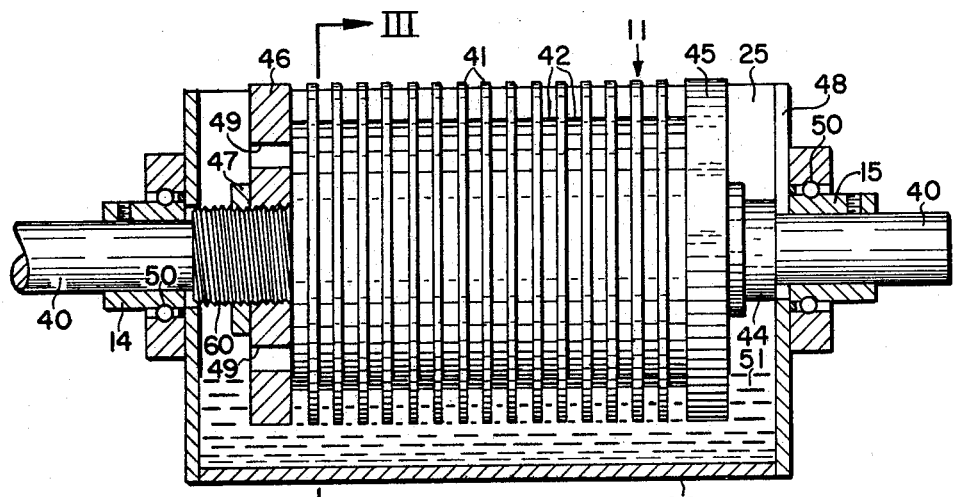
Fig. 2
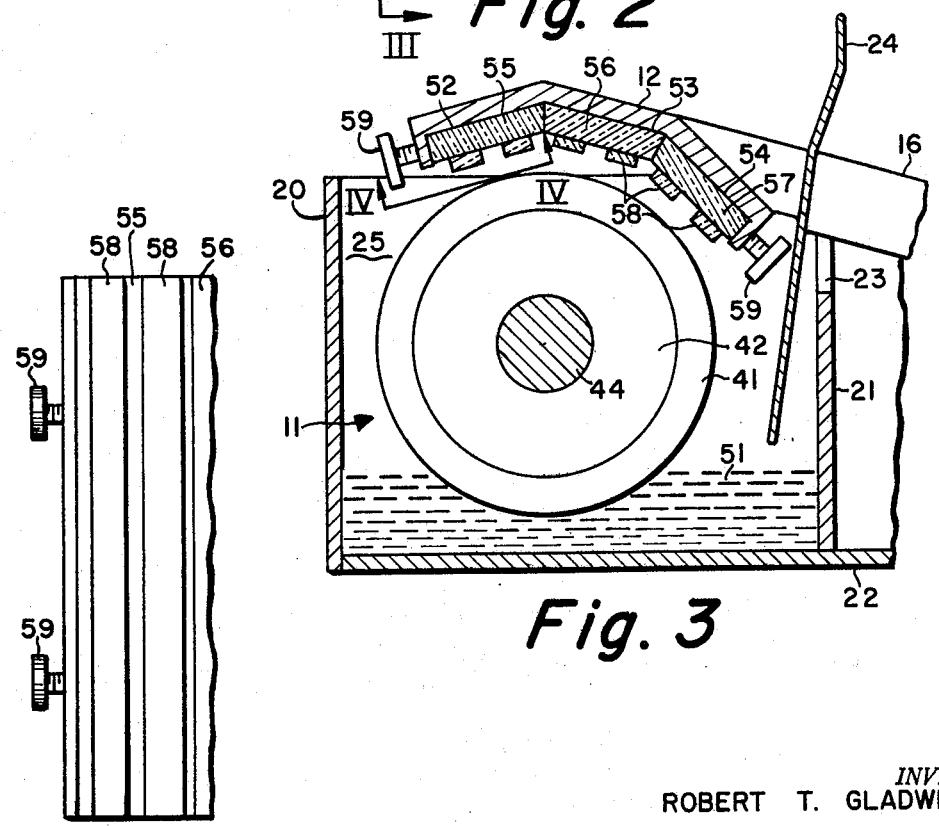
Fig. 3
Fig. 4
INVENTOR.
ROBERT T. GLADWELL JR.
BY William J. Simmons Jr.
ATTORNEY 3,486,496
CIRCULAR SLURRY SAW
Robert T. Gladwell, Jr., Raleigh, N.C., assignor to Corning Glass Works, Corning, N.Y., a corporation of New York
Filed Dec. 29, 1966, Ser. No. 605,833
Int. Cl. B28d 1/04
U.S. Cl. 125—13     5 Claims

ABSTRACT OF THE DISCLOSURE

A multi-blade circular saw is disclosed which cuts elongated strips of glass-like material into individual units. The elongated strips are mounted on a lever above the saw blades so that the weight of the lever and mounting assembly causes the elongated strips to exert proper cutting pressure against the blades. The blades are situated in a pan of slurry which is stirred by the rotation of the blades and carried by the blades to the surface which is to be cut.

---

The saw which is the subject of this invention is especially useful in the manufacture of small glass capacitors. During the process of manufacturing monolithic chip capacitors, an elongated block consisting of more than 100 individual capacitors, is initially formed. This block consists of a temporary base or substrate on which alternate layers of dielectric and conductive materials are applied. Alternate conductive layers are offset in opposite directions to permit electrical connection between alternate electrodes by means of a conductive material such as silver paint. These elongated blocks are then cut into individual units and leads are applied to the ends to form a completed capacitor.

The elongated capacitor blocks have been conventionally cut into individual units in one operation by a reciprocating slurry saw having a plurality of parallel linear blades which simultaneously engage the elongated block. The disadvantages of the reciprocating saw are lengthy changeover times and slow cutting speeds. Furthermore, the reciprocating saw has many precisely machined surfaces and requires precise blade tensioning.

This invention overcomes the disadvantages of prior art by utilizing a circular slurry saw, the blades of which extend into a pool of abrasive slurry to stir the same as well as to transport the slurry to the cutting surface. The circular saw produces comparable quality as compared to the linear saw with a reduction in saw time by a factor of two to three. Also, the time required to change from one blade pack to another is drastically shortened. Furthermore, this machine is less expensive, and it has fewer precision surfaces and therefore requires less maintenance.

Other adavntages and features of this invention will be apparent from a study of the accompanying disclosure, appended claims and drawing, in which:

FIG. 2 is a view in partial section taken along lines II—II of FIG. 1;

FIG. 3 is a sectional view taken along lines III—III of FIG. 2; and

FIG. 4 is a view taken along lines IV—IV of FIG. 3.

Figure 1:
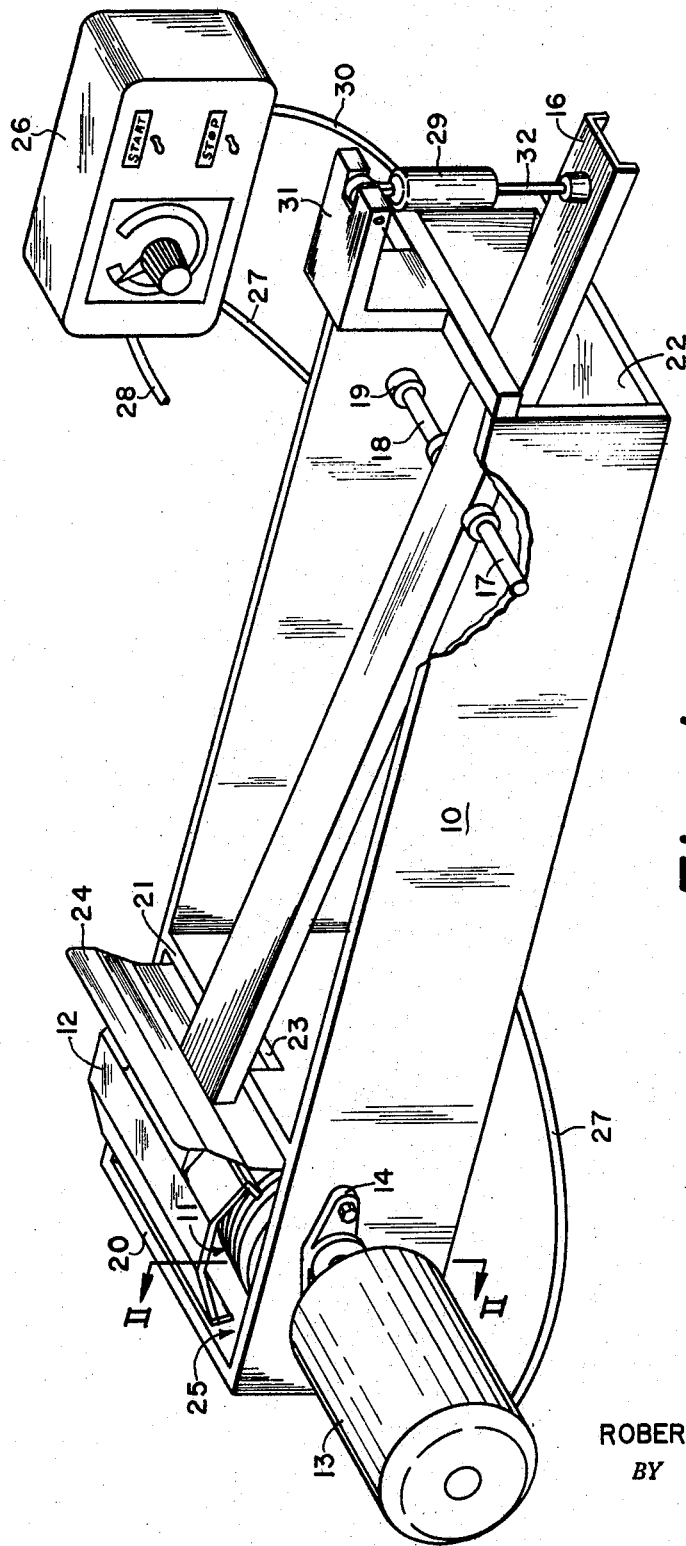
FIG. 1 is a perspective view of an apparatus constructed in accordance with this invention.

Referring to FIG. 1 there is shown a housing 10 which supports both the saw blade package 11 and the work support member 12. A motor 13 rotates the mandrel, one of the bearings of which is shown at 14. The work support member 12 is located at one end of a lever arm 16 which is pivotally mounted near the end of the housing 10 opposite the end which supports the blade package. A pair of shafts 17 and 18, which are secured to the lever arm 16, are rotatably mounted in the housing 10 and are prevented from moving longitudinally by collars 19 which are secured thereto. The saw mandrel is located in a leak-proof chamber 25 comprising the sidewalls of the housing 10, walls 20 and 21, and the housing floor 22. The wall 21 is provided with a notch 23 in which the lever arm may extend during the cutting operation. A splash plate 24, which is located on the lever arm, prevents the silicon carbide slurry, which is located at the bottom of the leak-proof housing 25, from splashing through the notch 23. A splash cover (not shown) hinges on the wall 20 and mates with the splash plate 24.

A timer 26 may be associated with the saw to terminate the cutting operation. The motor 13 may be connected to the timer by a wire 27 so that the motor may be turned off by the timer at the end of a predetermined cutting period. A source of compressed air which appears at line 28 is connected by the timer at the end of the predetermined period to a compressed air cylinder 29 by a line 30. The end of the compressed air cylinder is pivotally connected to a bracket 31 which is mounted on the housing 10, and the piston rod 32 is connected to the end of the lever arm 16 opposite that on which the work support member 12 is located.

The saw blade package, which is more clearly illustrated in FIGS. 2 and 3, consist of a shaft 40 on which are mounted a plurality of circular spring steel blades 41, adjacent blades being separated by spacers 42. The blades 41 are shown at a greatly enlarged scale for the sake of clarity. The central portion of the shaft 40 is enlarged as shown at 44, one end of the enlarged portion being threaded as shown at 60. A supporting disc 45 is fixedly mounted at one end of the enlarged portion 44 to prevent axial movement of the spacers and blades. After all the spacers and blades are mounted on the shaft portion 44 the other end thereof is secured by a second supporting disc 46 which is screwed on to the threaded portion 60. A nut 47 may be tightened on to the threaded portion to lock the supporting disc 46 into place. A plurality of holes 49 in each of the supporting discs are provided to facilitate tightening of the disc 46 on to the threaded portion 60 with the assistance of a tool which engages these holes. The bearing housings 14 and 15 are mounted on the sidewalls of the housing 10, and the inter-bearing races are rigidly mounted on the shaft 40, thereby preventing movement of the shaft 40 along its longitudinal axis. Seals 50 prevent silicon carbide slurry 51 from entering and damaging the bearings. A slot 48 in one of the sidewalls of the housing 10 facilitates the mounting of the blade package in the housing.

Details of the work support member 12 are more clearly shown in FIGS. 3 and 4. The work support member 12 contains three surfaces 52, 53 and 54 on which are mounted three substrates 55, 56 and 57 respectively. The substrates are locked into place by a plurality of screws 59. Each of the substrates contains two capacitor strips 58 which are cemented thereto. The angular alignment of the surfaces 52, 53 and 54 is such that the saw blades 41 simultaneously cut all of the capacitor strips 58.

The operation of this saw is as follows. The capacitor strips 58 are cemented to the substrates 55 which are then mounted in the work support member 12. The timer is set to a period of time which has been predetermined to be long enough to cut through the strips 58. The timer is set for approximately ten minutes for cutting through glass capacitor strips which measure ¼″ x 4″ x 0.050″ each. After the capacitor strips are cut through, the machine automatically shuts down and the work support member is raised away from the cutting blades by the action of the compressed air cylinder. The cutting action is provided by the silicon carbide slurry which is picked up by the blades and rolls between the blade and the work piece, thereby cutting the ware.

Although this invention has been described with particular reference to the manufacture of capacitors, it is not intended that the invention be limited in any way by this example which has been described merely to enable persons skilled in the art to more readily understand and practice the invention.

What is claimed is:

1. An abrasive saw comprising a leakproof housing, a pool of abrasive slurry contained within the bottom of said housing, a circular saw having at least one blade mounted in said housing so that a portion thereof is submerged in said pool of abrasive slurry, means for rotating said circular saw, means for mounting at least one piece of work over said saw and exerting a uniform pressure between said at least one piece of work and said saw, said saw carrying said slurry to said work where the abrasive action of said slurry cuts said work, a lever arm which is pivotally mounted in a central portion thereof to an extension of said housing, said means for mounting being mounted at one end of said lever arm which extends above said circular saw, the weight of said means for mounting and the weight and dimensions of said pivot arm determining said uniform pressure, lifting means connected to the end of said lever arm opposite that to which said means for mounting is connected for raising said work, and means to actuate said lifting means when said sawing operation is completed so that said work is removed from contact with said saw.

2. An abrasive saw as described in claim 1 wherein said means to actuate is energized a predetermined time after said saw begins to cut said work.

3. An abrasive saw comprising a leakproof housing, a pool of abrasive slurry contained within the bottom of said housing, a circular saw having at least one blade mounted in said housing so that a portion thereof is submerged in said pool of abrasive slurry, means for rotating said circular saw, and means for mounting at least one piece of work over said saw and exerting a uniform pressure between said at least one piece of work and said saw, said saw carrying said slurry to said work where the abrasive action of said slurry cuts said work, said means for mounting comprising a work holder having a plurality of surfaces for supporting a plurality of pieces of work, the intersections of said plurality of surfaces forming at least one line which is parallel to the axis of said at least one circular saw blade, said plurality of surfaces being oriented facing said saw so that said saw simultaneously cuts said plurality of pieces of work.

4. An abrasive saw as described in claim 3 wherein said means for mounting further comprises first and second flanged portions respectively attached to the opposed ends of said work holder, and means affixed to said flanged portions for securing work in said work holder.

5. An abrasive saw as described in claim 1 wherein said means for mounting comprises a work holder having a plurality of surfaces for supporting a plurality of pieces of work, the intersections of said plurality of surfaces forming at least one line which is parallel to the axis of said at least one circular saw blade, said surfaces being oriented so that an obtuse angle is included between adjacent surfaces facing said saw, first and second flanged portions respectively attached to the opposed ends of said work holder, and means affixed to said flanged portions for securing work in said work holder.

References Cited

UNITED STATES PATENTS

| | | | |
|---|---|---|---|
| 40,274 | 10/1863 | Parkes | 143—58 |
| 1,401,363 | 12/1921 | Richard | 143—58 |
| 1,970,122 | 8/1934 | Beth | 125—13 X |
| 2,279,979 | 4/1942 | Gillich | 125—13 |
| 2,308,703 | 1/1943 | McCain | 125—13 |
| 2,371,085 | 3/1945 | Waters | 125—13 |
| 671,830 | 4/1901 | Loesser | 125—30 |
| 835,964 | 11/1906 | Loesser | 125—30 |
| 3,138,065 | 6/1964 | Owens | 51—165 |
| 3,266,476 | 8/1966 | Swaab | 125—30 |

FOREIGN PATENTS 336,311  2/1959  Switzerland.

OTHELL M. SIMPSON, Primary Examiner

U.S. Cl. X.R.

83—567